(12) United States Patent
Brancaleone et al.

(10) Patent No.: US 8,522,481 B2
(45) Date of Patent: Sep. 3, 2013

(54) GLASS RUN MOUNTING ASSEMBLY FOR A VEHICLE DOOR

(75) Inventors: Robert Brancaleone, Farmington Hills, MI (US); Michael Kozak, Livonia, MI (US)

(73) Assignee: Ford Global Technologies, Dearborn, MI (US)

( * ) Notice: Subject to any disclaimer, the term of this patent is extended or adjusted under 35 U.S.C. 154(b) by 2208 days.

(21) Appl. No.: 11/307,360

(22) Filed: Feb. 2, 2006

(65) Prior Publication Data

US 2007/0175100 A1 Aug. 2, 2007

(51) Int. Cl.
E06B 7/16 (2006.01)

(52) U.S. Cl.
USPC .............................. 49/440; 49/502; 296/146.2

(58) Field of Classification Search
USPC .................. 49/502, 440; 296/146.2
See application file for complete search history.

(56) References Cited

U.S. PATENT DOCUMENTS

| | | | |
|---|---|---|---|
| 2,232,810 A * | 2/1941 | Simpson et al. ................ | 49/440 |
| 4,105,245 A | 8/1978 | Simons et al. | |
| 4,768,827 A | 9/1988 | Musgrove | |
| 4,957,321 A | 9/1990 | Martin et al. | |
| 4,969,295 A * | 11/1990 | Nishikawa et al. ............. | 49/502 |
| 4,979,773 A | 12/1990 | Eubank | |
| 5,092,078 A | 3/1992 | Keys | |
| 5,384,946 A | 1/1995 | Sundstedt et al. | |
| 5,492,389 A | 2/1996 | McClintock et al. | |
| 5,570,931 A | 11/1996 | Kargilis et al. | |
| 5,839,773 A | 11/1998 | Ban et al. | |
| 5,979,964 A | 11/1999 | Ban et al. | |
| 6,007,140 A * | 12/1999 | Heitmann et al. ......... | 296/146.9 |
| 6,103,168 A | 8/2000 | Kelly | |
| 6,106,066 A | 8/2000 | Moffa et al. | |
| 6,112,470 A | 9/2000 | Hashimoto et al. | |
| 6,279,987 B1 * | 8/2001 | Keeney et al. ............. | 296/146.9 |
| 6,416,113 B1 | 7/2002 | Page | |
| 6,540,294 B2 | 4/2003 | Moffa et al. | |
| 6,631,946 B1 | 10/2003 | Neale | |
| 6,641,204 B2 | 11/2003 | Ogawa et al. | |
| 6,708,450 B2 | 3/2004 | Tanaka et al. | |
| 6,749,247 B1 | 6/2004 | Mack et al. | |
| 6,837,530 B2 | 1/2005 | Rudberg et al. | |
| 6,846,044 B2 | 1/2005 | Moffa et al. | |
| 6,883,854 B2 | 4/2005 | Daniel | |
| 6,929,307 B1 | 8/2005 | Grimm et al. | |
| 6,964,133 B2 | 11/2005 | Aritake et al. | |
| 6,974,184 B1 | 12/2005 | Moffa et al. | |
| 7,055,285 B2 * | 6/2006 | Nozaki ........................ | 49/479.1 |
| 7,383,662 B2 * | 6/2008 | Tamaoki ....................... | 49/441 |
| 2001/0001917 A1 * | 5/2001 | Goto ............................. | 49/440 |
| 2001/0015035 A1 * | 8/2001 | Nozaki ......................... | 49/440 |
| 2004/0244298 A1 * | 12/2004 | Ogawa et al. ................ | 49/502 |
| 2006/0181107 A1 * | 8/2006 | Nishikawa ................ | 296/146.2 |

* cited by examiner

*Primary Examiner* — Katherine Mitchell
*Assistant Examiner* — Catherine A Kelly
(74) *Attorney, Agent, or Firm* — Jerome R. Drouillard; Jason Rogers

(57) ABSTRACT

A glass run mounting assembly ("mounting assembly") for a vehicle door. The mounting assembly includes an elongated stepped bracket and an elongated plate attached to the bracket. The plate and the bracket define a channel with a glass run retention member therein. The plate has an outer surface, an inner surface, and a wall thickness therebetween. The outer surface of the plate has an appliqué thereto. The elongated plate offsets the appliqué from the glass pane substantially by one of wall thickness of the elongated plate.

20 Claims, 2 Drawing Sheets

GLASS RUN MOUNTING ASSEMBLY FOR A VEHICLE DOOR

TECHNICAL FIELD

The present invention relates generally to vehicle doors with sash constructions, and particularly to mounting assemblies that attach glass runs and appliqué to a vehicle door.

BACKGROUND

Vehicle doors with sash constructions typically include mounting assemblies that attach a glass run and an exterior appliqué to a main door body. The typical mounting assembly is a sheet metal construction, which can determine vehicle craftsmanship and functional attributes. For example, the sheet metal construction can determine the distance from the outer surface of the glass windowpane to adjacent exterior surfaces. In this regard, the mounting assembly can determine the smoothness of the overall vehicle exterior surface.

Referring to FIG. 1, one known mounting assembly 10 is comprised of a one-piece sheet metal construction 12 with an overlapped portion 14 defining an interior channel 16 and an exterior surface 18. The interior channel 16 typically receives the glass run (not shown), which is an elastomeric seat that receives an end portion 20 of the windowpane 22 when the window is in the closed position. In this respect, the glass run can seal the windowpane 22 closed and cushion the windowpane 22. Furthermore, the exterior surface 18 of the mounting assembly 10 along with one or more adjacent exterior vehicle structures (not shown) typically have an appliqué (not shown) attached thereto. It is understood that the is offset from the windowpane 22 by the thickness (2T) of the overlapped portion 14 of the sheet metal 12. In other words, the appliqué is offset from the windowpane 22 by at least twice the thickness (T) of the sheet metal 12.

It would therefore be desirable to provide a mounting assembly that minimizes the offset distance between the appliqué and the windowpane and thus decreases air drag on the vehicle and streamlines the vehicle design.

SUMMARY OF THE INVENTION

A glass run mounting assembly ("mounting assembly") for a vehicle door is provided. The mounting assembly includes an elongated stepped bracket and an elongated plate attached to the elongated stepped bracket. The elongated plate and the elongated stepped bracket define a channel with a glass run retention member therein. The elongated plate has an outer surface, an inner surface, and a wall thickness therebetween. The outer surface mounts an appliqué to the vehicle door. The elongated plate offsets the appliqué from the glass pane substantially by one wall thickness of the elongated plate.

One advantage of the present invention is that a glass run mounting assembly is provided that minimizes the glass offset and thus decreases vehicle drag.

Another advantage of the present invention is that a glass run mounting assembly is provided that increases the smoothness in the exterior vehicle contour and enhances the vehicle design.

Yet another advantage of the present invention is that a glass run mounting assembly is provided that improves flushness of an appliqué to the exterior vehicle surfaces.

Still another advantage of the present invention is that a glass run mounting assembly is provided that improves the fuel economy of a vehicle.

Yet another advantage of the present invention is that a glass run mounting assembly is provided that enhances the vehicle acceleration.

Other advantages of the present invention will become apparent upon considering the following detailed description and appended claims, and upon reference to the accompanying drawings.

BRIEF DESCRIPTION OF THE DRAWINGS

For a more complete understanding of this invention, reference should now be made to the embodiments illustrated in greater detail in FIGS. 2 through 4 and described below by way of the examples of the invention.

DETAILED DESCRIPTION OF THE INVENTION

Figure 1:
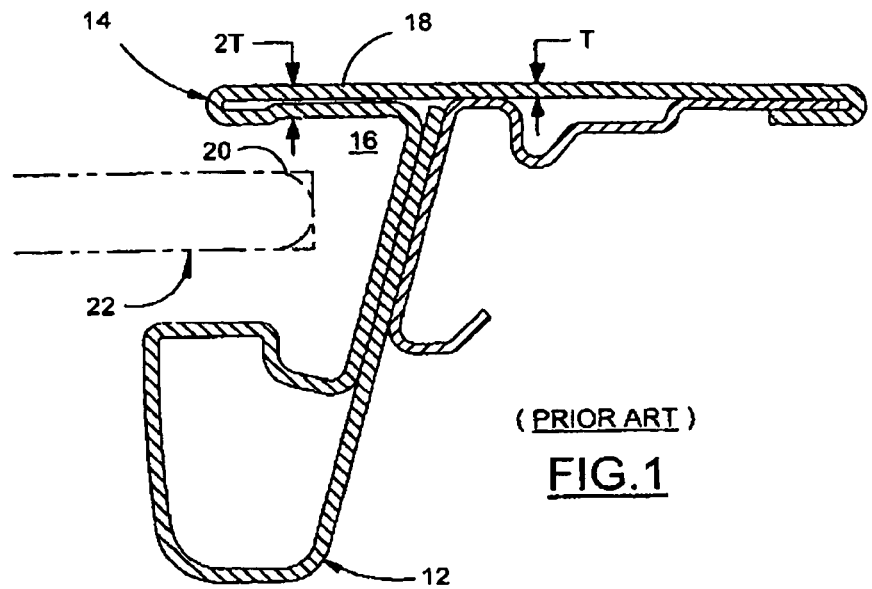
FIG. 1 is a cross-sectional view of a conventional mounting assembly for attaching a glass run and an appliqué to a vehicle door.

In the following figures, the same reference numerals are used to identify the same components in the various views.

The present invention is particularly suited for a glass run mounting assembly for a vehicle door. In this way, the embodiments described herein employ structural features where the context permits. However, various other embodiments are contemplated having different combinations of the described features, having features other than those described herein, or lacking one or more of those features. Thus, it is contemplated that the invention can be carried out in a variety of other modes and utilized for other suitable applications as desired. For instance, the invention can be integrated within a variety of other suitable vehicle structures as desired.

Figure 2:
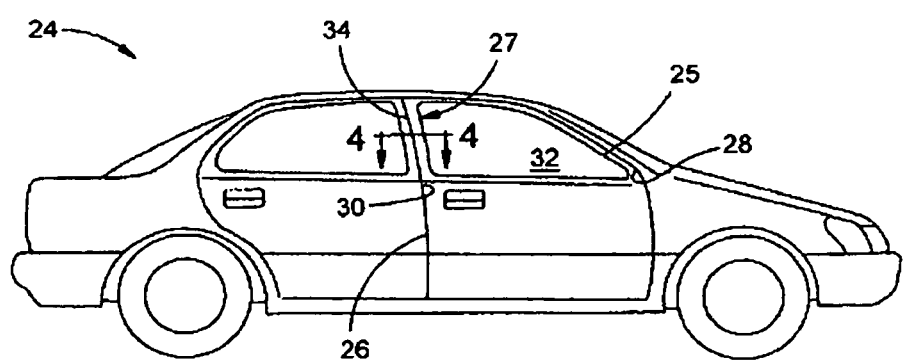
FIG. 2 is a perspective view of a vehicle having a door with a glass run mounting assembly, according to one advantageous embodiment of the claimed invention.
Figure 3:
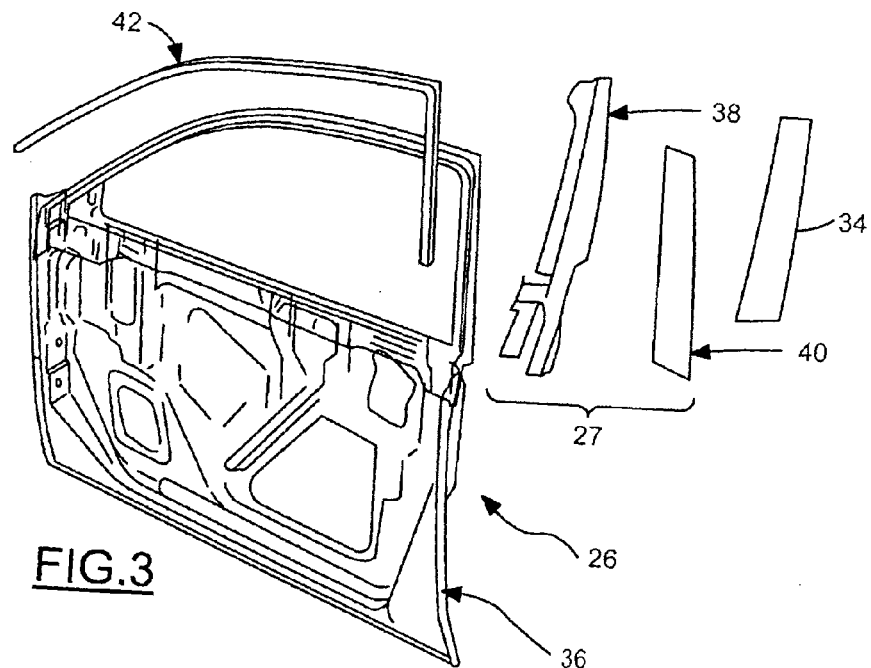
FIG. 3 is an exploded view of the door shown in FIG. 2.

Referring to FIG. 2, there is shown a vehicle 24 having a door 26 with a windowpane 25 sealingly mounted therein by a glass run mounting assembly 27 ("mounting assembly") (shown in FIGS. 2 and 3). The door 26 is pivotally attached to an A-pillar structure 28 of the vehicle 24 with the mounting assembly 27 adjacent to the B-pillar structure 30. As detailed below, the mounting assembly 27 minimizes the distance by which the outer surface 32 of the windowpane 22 is offset inboard from adjacent exterior surfaces, such as an appliqué 34. In this respect, the mounting assembly 27 provides a substantially streamlined overall vehicle exterior surface, decreases the drag on the vehicle 24, improves the fuel economy for the vehicle 24, enhances the vehicle acceleration, and improves the aesthetic appearance of the vehicle 24.

Figure 4:
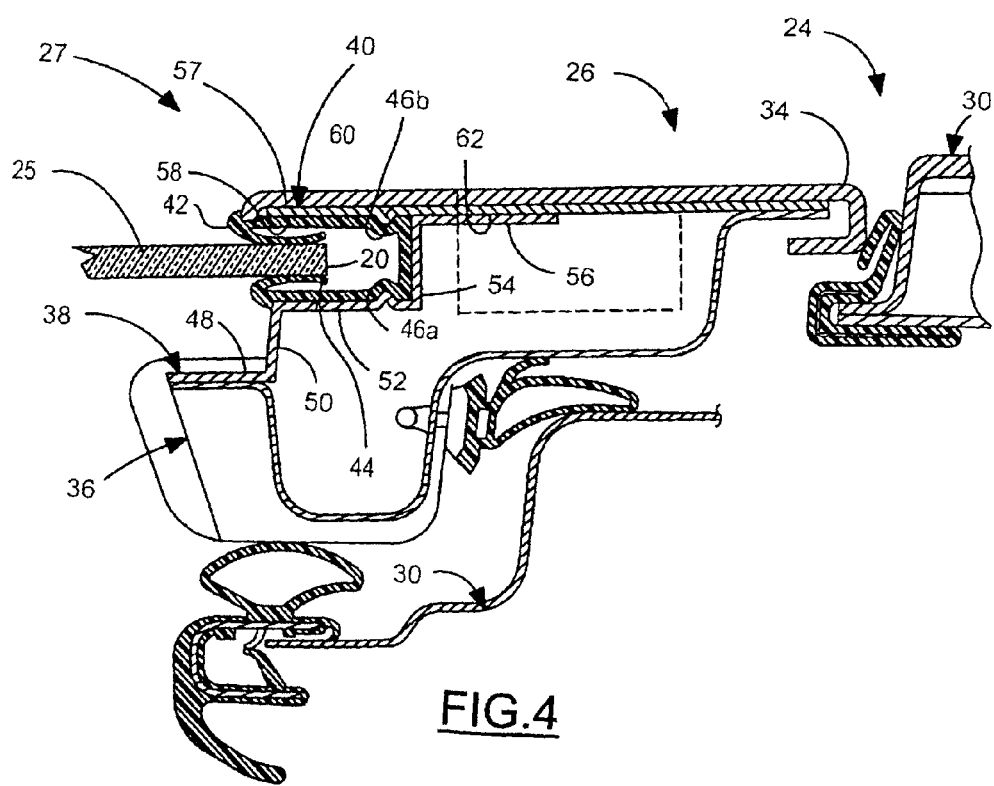
FIG. 4 is a cross-sectional view of the glass run mounting assembly shown in FIG. 3.

In the embodiment shown in FIGS. 3 and 4, the mounting assembly 27 is attached to a door inner 36 for the door 26. The mounting assembly 27 includes an elongated stepped bracket 38, an elongated plate 40, a glass run retention member 42 ("retention member"), and the appliqué 34.

As best shown in FIG. 4, the elongated stepped bracket 38 and the elongated plate 40 have sheet metal constructions defining a channel 44 with the retention member 42 seated therein. The retention member 42 is comprised of an elastomeric material for sealing an end portion 20 of the windowpane 22 and cushioning the same. In this embodiment, the elongated stepped bracket 38 and the elongated plate 40 have a pair of opposing ridges 46a, 46b or other suitable retention protrusions extending therefrom for press-fitting the retention member 42 within the channel 44. It is contemplated that the elongated stepped bracket 38, the elongated plate 40, and the retention member 42 can instead be comprised of various other suitable materials.

The stepped bracket 38 has a series of planar portions extending along its length. These planar portions include an inner planar portion 48, a clearance planar portion 50, a first channel planar portion 52, a second channel planar portion 54, and an outer planar portion 56. The inner planar portion 48 is welded or otherwise suitably attached to the door inner 36. Also, the outer planar portion 56 has the elongated plate 40 welded or otherwise suitably attached thereto.

The clearance planar portion 50 extends substantially perpendicularly from the inner planar portion 48 so as to position the windowpane 22 a predetermined distance from the door inner 36. The first channel planar portion 52 extends substantially perpendicularly from the clearance planar portion 50 and distal to the inner planar portion 48. The second channel planar portion 54 extends substantially perpendicularly from the first channel planar portion 52 and distal to the clearance planar portion 50. The first and second channel planar portions 52 and 54 are sufficiently sized for receiving the depth and width of the retention member 42. The outer planar portion 56 extends substantially perpendicularly from the second channel planar portion 54 and distal to the first channel planar portion 52.

The elongated plate 40 has an outer surface 57, an inner surface 58, and a wall thickness (T) therebetween. The inner surface 58 of the elongated plate 40 has a channel surface portion 60 and an attachment surface portion 62 adjacent thereto. The attachment surface portion 62 is welded or otherwise suitably attached to the outer planar portion 56 of the elongated stepped bracket 38. Furthermore, the channel surface portion 60 of the elongated plate 40 assists in defining the channel 44. The outer surface 32 has the appliqué 34 attached thereto. In this embodiment, the appliqué 34 is attached exclusively to the elongated plate 40. This feature is beneficial for eliminating the need for aligning the appliqué 34 with two or more mounting fixtures and thus decreases the installation time associated therewith. However, it will be appreciated that the appliqué 34 can be mounted to two or more mounting fixtures as desired.

Also, as introduced above, the ridges 46a, 46b extend respectively from the first channel planar portion 52 of the elongated stepped bracket 38 and the channel surface portion 60 of the elongated plate 40.

As best shown in FIG. 4, the elongated plate 40 is substantially planar and extends unilaterally across the elongated stepped bracket 38. In this respect, the appliqué 34 is offset from the outer surface 32 of the windowpane 22 substantially by one wall thickness (T) of the elongated plate 40. Accordingly, the mounting assembly 27 positions the appliqué 34 substantially close to the outer surface 32 of the windowpane 22 and thus provides a more streamlined vehicle exterior surface. As introduced above, this feature is beneficial for minimizing the vehicle drag, improving fuel economy, increasing vehicle acceleration, and enhancing vehicle design.

While particular embodiments of the invention have been shown and described, it will be understood, of course, that the invention is not limited thereto since modifications may be made by those skilled in the art, particularly in light of the foregoing teachings. Accordingly, it is intended that the invention be limited only in terms of the appended claims.

What is claimed is:

1. A glass run mounting assembly for a vehicle door, comprising:
   an elongated stepped bracket;
   an elongated plate attached to said elongated stepped bracket; and
   a channel defined by said elongated stepped bracket and said elongated plate;
   said channel receiving a glass run retention member;
   said elongated plate having an outer surface, an inner surface, and a wall thickness therebetween;
   said elongated plate extending unilaterally across said elongated stepped bracket and offsetting an appliqué from said glass pane substantially by said wall thickness.

2. The glass run mounting assembly recited in claim 1 wherein said elongated stepped bracket is comprised of:
   an inner planar portion attached to a vehicle door;
   a clearance planar portion extending substantially perpendicularly from said inner planar portion;
   a first channel planar portion extending substantially perpendicularly from said clearance planar portion and distal to said inner planar portion;
   a second channel planar portion extending substantially perpendicularly from said first channel planar portion and distal to said clearance planar portion;
   an outer planar portion extending substantially perpendicularly from said second channel planar portion and distal to said inner planar portion;
   said inner planar portion, said clearance planar portion, said first channel planar portion, said second channel planar portion, and said outer planar portion extending along the length of said elongated stepped bracket.

3. The glass run mounting assembly recited in claim 2 wherein said first channel planar portion has a retention protrusion extending therefrom and into said channel for contacting said glass run retention member.

4. The glass run mounting assembly recited in claim 3 wherein said retention protrusion is a ridge integrally formed within said first channel planar portion.

5. The glass run mounting assembly recited in claim 2 wherein said outer planar portion of said elongated stepped bracket is attached to said inner surface of said elongated plate.

6. The glass run mounting assembly recited in claim 1 wherein said inner surface of said elongated plate has a retention protrusion extending therefrom and into said channel for contacting said glass run retention member.

7. The glass run mounting assembly recited in claim 1 wherein at least one of said elongated plate and said elongated stepped bracket is comprised of sheet metal.

8. A vehicle door comprising:
   a door inner;
   a glass pane;
   said glass run mounting assembly recited in claim 1 with said elongated plate, said elongated stepped bracket, and said channel;
   said elongated stepped bracket attached to said door inner; and
   an appliqué attached to said outer surface of said elongated plate; said channel receiving said glass run retention member.

9. A vehicle body-side structure comprising:
   an A-pillar structure;
   a B-pillar structure; and
   said vehicle door recited in claim 8 and pivotally extending from said A-pillar structure;

said glass run mounting assembly adjacent to said B-pillar structure.

10. A glass run mounting assembly for a vehicle door, comprising:
an elongated stepped bracket;
an elongated plate attached to said elongated stepped bracket; and said elongated plate having a substantially planar construction;
a channel defined between said elongated stepped bracket and said elongated plate;
a glass run retention member within said channel and receiving an edge portion of a glass pane;
said elongated plate having an outer surface, an inner surface, and a wall thickness therebetween;
said elongated plate extending unilaterally across said elongated stepped bracket and offsetting an appliqué from said glass pane substantially by said wall thickness.

11. The glass run mounting assembly recited in claim 10 wherein said inner surface of said elongated plate is comprised of:
a channel surface portion defining said channel; and
an attachment surface portion extending from said channel surface portion;
said attachment surface portion with said elongated stepped bracket attached thereto.

12. The glass run mounting assembly recited in claim 11 wherein said channel surface portion has a retention protrusion extending therefrom and into said channel for contacting said glass run retention member.

13. The glass run mounting assembly recited in claim 12 wherein said retention protrusion is a ridge integrally formed within said channel surface portion.

14. The glass run mounting assembly recited in claim 11 wherein said elongated stepped bracket is comprised of:
an inner planar portion attached to a vehicle door;
a clearance planar portion extending substantially perpendicularly from said inner planar portion;
a first channel planar portion extending substantially perpendicularly from said clearance planar portion;
a second channel planar portion extending substantially perpendicularly from said first channel planar portion;
an outer planar portion extending substantially perpendicularly from said second channel planar portion;
said inner planar portion, said clearance planar portion, said first channel planar portion, said second channel planar portion, and said outer planar portion extending along the length of said elongated stepped bracket.

15. The glass run mounting assembly recited in claim 14 wherein said outer planar portion of said elongated stepped bracket is attached to said attachment surface portion of said elongated plate.

16. A vehicle door comprising:
a door inner;
a glass pane;
said glass run mounting assembly recited in claim 10 with said elongated plate, said elongated stepped bracket, and said channel;
said elongated stepped bracket attached to said door inner; and an appliqué attached to said outer surface of said elongated plate.

17. The vehicle door recited in claim 16 wherein said appliqué is attached exclusively to said elongated plate.

18. A vehicle body-side structure comprising: an A-pillar structure;
a B-pillar structure; and
said vehicle door recited in claim 16 and pivotally attached to said A-pillar structure;
said vehicle door having said glass run mounting assembly adjacent to said B-pillar structure.

19. A glass run mounting assembly for a vehicle door, comprising: an elongated bracket;
an elongated plate attached to said elongated bracket;
a channel defined between said elongated bracket and said elongated plate;
a glass run retention member within said channel and receiving an end portion of a glass pane;
said elongated plate having an outer surface, an inner surface, and a wall thickness therebetween;
an appliqué attached to said outer surface;
said appliqué offset from said glass pane substantially by one of said wall thickness.

20. The glass run mounting assembly recited in claim 19 wherein said elongated plate extends unilaterally across said elongated bracket.

* * * * *